United States Patent [19]

Brault

[11] 4,198,018

[45] Apr. 15, 1980

[54] BLENDED WING-FUSELAGE FRAME MADE OF FIBER REINFORCED RESIN COMPOSITES

[75] Inventor: Paul C. Brault, Bellevue, Wash.

[73] Assignee: The Boeing Company, Seattle, Wash.

[21] Appl. No.: 886,138

[22] Filed: Mar. 13, 1978

[51] Int. Cl.$^2$ ............................................. B64C 1/06
[52] U.S. Cl. ................................... 244/119; 244/123; 428/119
[58] Field of Search ............... 244/119, 120, 123, 131; 428/119, 182, 184; 52/734, 731, 729

[56] References Cited

U.S. PATENT DOCUMENTS

| | | | |
|---|---|---|---|
| 1,883,672 | 10/1932 | Foster | 244/123 X |
| 2,500,015 | 3/1950 | Tweney et al. | 244/119 |
| 2,997,262 | 8/1961 | Kirk et al. | 244/123 |
| 4,084,029 | 4/1978 | Johnson et al. | 428/119 |

Primary Examiner—Barry L. Kelmachter
Attorney, Agent, or Firm—Christensen, O'Connor, Johnson & Kindness

[57] ABSTRACT

A unitary frame having a central, annular-shaped fuselage section and a pair of outwardly opposed wing spars is fabricated from fiber-reinforced, resin matrix composites, and constitutes one of a number of similar such frames that are assembled together to form a framework of an aircraft body. Each wing spar has the general configuration of an I-beam incorporating a sine wave shear web reinforced along the upper and lower edges by flanges and lengthwise extending, tension/compression chords formed by bundles of lengthwise oriented fibers. The fuselage section has a circumferentially oriented sine wave shear web that is otherwise similar to the web of the wing spars, and has inner and outer circumferentially extending flanges that are similar to the upper and lower flanges along the wing spars. The root of each wing spar is joined to the respective side of the fuselage section by continuing the tension/compression chords into the fuselage section and by inserting a transition structure, in the form of a lightweight honeycomb core sandwiched between a pair of facing panels, at the juncture between the root of the wing spar and the fuselage section. The transition structure efficiently reacts loads developed along the tension/compression chords due to bending of the wing spar, and geometrically blends vertically oriented corrugations in the wing spar web with radially oriented corrugations in the web of the fuselage section.

4 Claims, 20 Drawing Figures

BLENDED WING-FUSELAGE FRAME MADE OF FIBER REINFORCED RESIN COMPOSITES

BACKGROUND OF THE INVENTION

The invention pertains to the construction and manufacture of aircraft frame members of the type in which a fuselage section and a pair of associated wing spars are fabricated as a unit from lightweight, fiber reinforced matrix composites, and wherein the fuselage section and the wings spars incorporate sine wave webs for resisting shear loads, and multiple fiber chords are affixed along the opposed edges of the sine wave webs for resisting bending loads, especially bending loads applied to the wing spars.

The use of fiber reinforced resin matrix composites as the basic structural elements of aircraft bodies has well known advantages, including a highly desirable strength to weight ratio. In many cases the composites are fabricated to resemble the basic structural shapes of traditionally used metal parts, and are merely subtituted for the latter. On the other hand, those who have recognized the unique characteristics of composites, especially the manner in which they are fabricated, have proposed innovative composite structures which are impractical to fabricate from metal, but which yield aircraft frames that are superior, on an overall comparative basis, to conventional metal frames, and are capable of being manufactured at a lower cost.

One particularly promising composite structure incorporates a sine wave shear web in the wing spars and fuselage section of the frame. Wing spars made in the configuration of an I-beam having a sine wave web have a number of advantages over composite I-beams incorporating other web configurations, such as a planar web, a beaded web, a planar web having rib-like stiffeners affixed thereof, and a web made of a honeycomb structure. On a comparative basis, an I-beam wing spar with a sine wave web is second only to the honeycomb web in shear versus weight capability and manufacturability, and is far superior to the honeycomb web in repairability and volume displacement (important when the holow interiors of the wings are used as fuel tanks). In this latter regard, the wings of aircraft are often designed to form hollow fuel receiving compartments in which the stored fuel is in direct contact with the structural components of the wing. Experience has shown that a sine wave web, presumably because of the multiple sheet laminations which form the web, is far more resistant to contact with fuel than is a web formed by a honeycomb core sandwich which may absorb the fuel into the cells of the honeycomb and cause internal deterioration of the core if the web or moisture barrier on the web is damaged.

While the sine wave shear web thus has a number of desirable features, there has not previously been a satisfactory way of joining the sine wave web wing spars to a fuselage section that also incorporates a sine wave web in order to form a unitary frame. As defined herein, the term "frame" refers to a structural unit oriented in a plane transverse to the longitudinal axis of the aircraft and encompassing a central, fuselage section and a pair of outwardly and generally diametrically opposed wing spars. In the completed aircraft, a number of these frames are assembled in longitudinally spaced intervals to form the framework of the body with the fuselage sections forming the bulkheads of the fuselage and the wing spars forming the principal structural members of the wings. Lacking a satisfactory way of joining the wing spars to the fuselage section, it has been the most generally accepted practice to fabricate the fuselage section and wing spars separately and provide each with structure suitable for joining the parts with bolts and connective plates and brackets. However, bolted-on joints are prone to fatigue failure. Additionally, the high part count associated with such connecting hardware increases the initial assembly cost and requires a larger inventory of parts for maintenance and repair.

With this background, it is accordingly one object of the invention to provide a wing spar and fuselage frame incorporating sine wave webs as the principal structure for bearing shear loads and having a configuration and assemblage suitable for being fabricated as a unitary structure.

Another object of the invention is to provide a transition structure in a unitary aircraft frame for joining the roots of I-beam wing spars made with sine wave shear webs to a central fuselage section made with a circumferentially oriented sine wave shear web, in which the transition structure efficiently reacts bending induced tension and compression loads that develop in the wing spars where they join the fuselage section. A related object is to provide a transition structure for geometrically blending vertically oriented corrugations of the sine wave shear web in the wing spars with radially oriented corrugations of the sine wave shear web in the fuselage section in a manner that enhances the strength and durability of the wing spars to fuselage joints.

Still a further object is to provide an aircraft frame that is capable of being fabricated as a unitary structure from fiber reinforced resin matrix composites and which has the combined characteristics of substantial shear capability versus weight, minimum volume displacement, ease of repair, and ease of fabrication compared to other frame configurations made from composites.

SUMMARY OF THE INVENTION

The above stated objects are attained by a blended wing-fuselage frame constructed according to the principles of the invention to structurally join wing spars incorporating the above described sine wave webs, with an annular fuselage section having a circumferentially oriented sine wave web, by a transition web structure in the configuration of a pair of spaced parallel panels, also made from composites, sandwiching a lightweight core material, such as a honeycomb core, to which the panels are bonded. The sine wave webs have corrugations, the amplitudes of which are bounded by two spaced parallel reference planes oriented transversely with respect to the longitudinal axis of the aircraft body. The corrugations of the wing spar web are oriented in a vertical sense for maximum resistance to load pressure on the wing and resultant shear loads in the frame, and the corrugations of the fuselage web are oriented generally radially for maximum resistance to bending induced radial loads, and shear loads.

Flanges, also made of composites are provided along the upper and lower lengthwise edges of both wing spar webs (to form an I-beam configuration), and similar flanges made of composite are formed around the inner and outer circumferential edges of the sine wave web in the fuselage section. These flanges are joined to the associated sine wave webs by specially configured connective structures which, when viewed in cross section, form hollow chordways that extend along the edges of the webs and receive tension/compression bearing chords comprising bundles of continuous fibers oriented lengthwise of the chords.

In the region where the roots of the wing spars join the fuselage section, the tension/compression chords of the wing spars continue into the fuselage forming the inner and/or outer chords of the fuselage section so that bending loads placed on the wings and thus on the wing spars are transformed into tension and compression loads that originate in the wing spar chords and that are transmitted on into the fuselage by the continuation of such chords into and around the fuselage section of the frame. In this manner, bending loads which result from either distributed air pressure loads or local loads, e.g., from a landing gear or wing fin, applied to the wing or wing spar outboard of the fuselage are borne by the fuselage section and thus beyond the localized regions at the roots of the wing spars.

As the chords pass from the wing spars into the fuselage section they typically must round small radius curves the mark the transistion between the wings and fuselage. To enable the chords to bear the substantial tension and compression loading to which they are subjected in this region, without causing intolerable stresses in the curved segments of the chords, the transition structures are disposed parallel to the pair of planes which define the amplitude envelope of the sine wave webs and thus in edgewise registration between the upper and lower chords at the roots of the wing spars. The transition structures which are capable of bearing substantial compression and tension loading (more so that a sine wave shear web) efficiently react loads that emanate radially from the curved segments of the chords. These radially oriented loads exert a tension load on the transition structure when the chord from which the loads originate is itself in tension, and exert a compression load on the transition structure when the chord from which the loads originate is itself in compression. The tension in the chord tends to straighten its curvature and thereby pull it away from the adjoining edge of the sandwich core structure (applying tension). A compression load on the chord tends to bend the chord further, forcing it against the edge of the transition structure (applying compression). These radial loads are transferred to the transition web structure along shear bondlines between the chords and the transition web. From the transition web, the loads are redistributed in tension, compression, and shear to the fuselage section of the frame.

The blended wing-fuselage frame is fabricated into a unitary structure and then assembled with other, similarly configured frames to form the framework of the aircraft body. In fabricating each frame, certain of the components of the frame may be separately laid-up and thereafter combined and cured together in a final operation. Thus, the sine wave webs of the wing spars and fuselage section and their associated flanges, the transition web, and the tension/compression chords may each be individually laid-up. Thereafter, all these components are arranged in the proper relationship and cured together into the desired unitary frame.

To provide a complete disclosure of the invention, reference is made to the appended drawings and the following detailed description of its presently preferred embodiments.

BRIEF DESCRIPTION OF THE DRAWINGS

FIG. 9 is a fragmentary horizontal, sectional view taken along line 9—9 of FIG. 3 illustrating the region at which the wing spar root is joined to fuselage section.

FIG. 10 is a sectional view taken along a radially oriented plane indicated by line 10—10 of FIG. 3 at a location below and adjacent the joint of the wing spar with the fuselage section.

DETAILED DESCRIPTION

Figure 1:
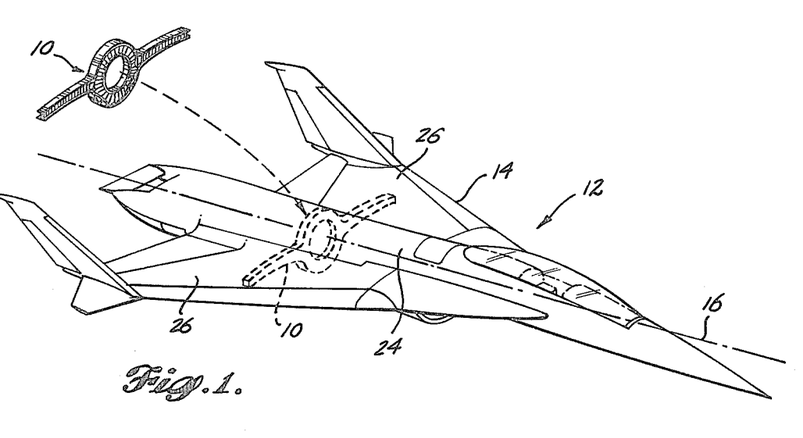
FIG. 1 is a perspective view of a delta wing aircraft body constructed with a framework of a plurality of the blended wing-fuselage frames of the invention, one of which has been removed from the aircraft body, for illustrative purposes, in which the arrow points to the dotted line showing of the location and orientation of such frame.

With reference to FIG. 1, a blended wing-fuselage frame 10 made of fiber reinforced resin matrix components and incorporating the principles of the invention, is illustrated in the environment of an aircraft 12 of the type having a delta wing body 14. Although a single frame 10 is illustrated in conjunction with aircraft body 14, there are actually a plurality of similar frames arranged at longitudinally spaced intervals within body 14, each being disposed within a reference plane oriented transverse to the longitudinal axis 16 of the aircraft body.

Figure 2:
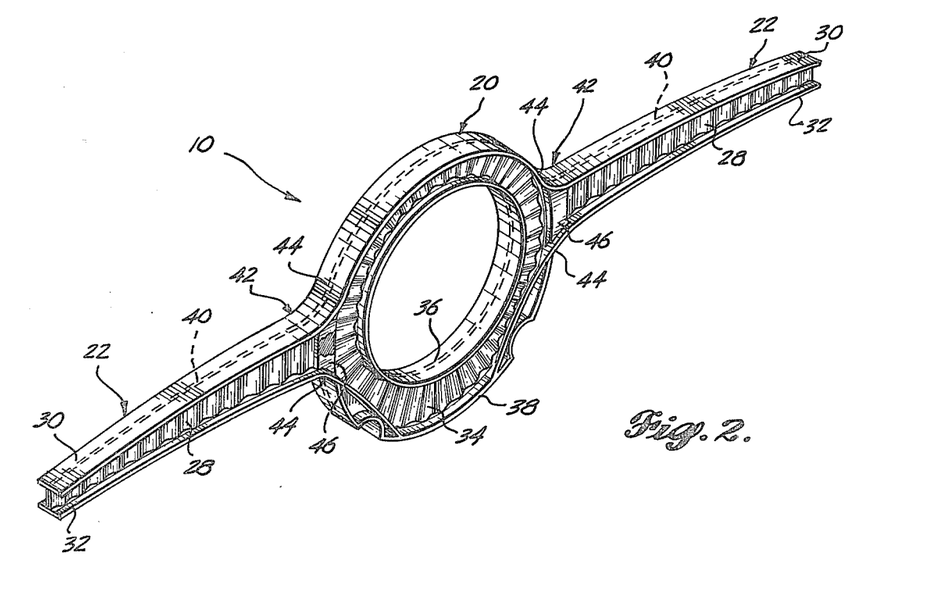
FIG. 2 is an enlarged perspective view of the individual frame removed from the aircraft body of FIG. 1.

As illustrated in FIG. 2, frame 10 includes a central, generally annular, fuselage section 20 and a pair of integrally joined wing spars 22 projecting radially outwardly from generally diametrically opposite sides of fuselage section 20. As depicted in FIG. 1, the annular fuselage section 20 forms one of a plurality of bulkheads which form the skeleton structure for the fuselage 24 of aircraft body 14, and wing spars 22 form the principal structural elements for the delta wings 26 which are appended to fuselage 24.

Wing spars 22 have the general configuration of I-beams, and more particularly of I-beams incorporating sine wave shear webs 28. Provided along the upper and lower lengthwise edges of webs 28 are a pair of flanges 30 and 32, respectively, which complete the cross sectional shape of the I-beam. With wing spars 22 being disposed in a horizontal plane, it is observed that the corrugations of shear webs 28 are oriented in a vertical sense for supporting pressure loads applied to wings 26 and resultant shear loads in the frame 10. Spars 22 may be fabricated by multiple lay-ups of fiber reinforced resin matrix composites as briefly discussed hereinafter, and as more fully disclosed in a copending U.S. application entitled SINE WAVE BEAM WEB AND METHOD OF MANUFACTURE, Ser. No. 818,910, filed July 25, 1977, by William R. Johnson and Ralph R. Welch, now U.S. Pat. No. 4,084,029.

Annular fuselage section 20 is constructed with a cross sectional configuration similar to that of spars 22, except that a sine wave shear web 34 and appended flanges 36 and 38 are shaped in a circumferentially extending pattern conforming to the annular configuration of section 20, rather than being elongated as are spars 22. Thus, the corrugations of sine wave shear web 34 of fuselage section 20 are oriented along radial lines to provide maximum shear resistance to bending induced radial and shear loads and flanges 36 and 38 of structure 20 are affixed about the circumferentially inner and outer edges, respectively, of web 34.

To strengthen spars 22 so that they more effectively support bending loads, flanges 30 and 32 are joined to the sine wave shear webs 28 by connective structures, which as more fully described and illustrated herein, receive lengthwise oriented tension/compression chords, the upper one of which, chord 40, is shown in this view only by hidden lines. Chord 40 and a like chord extending along lower edge of frame 10 are formed by bundles of longitudinally oriented, high tensile strength fibers embedded in a resin matrix, in which the cross sectional areas of chords 40 vary along the length of wing spars 22, commensurate with the magnitude of the anticipated load.

The roots 42 of wing spars 22 are joined to diametrically opposed sides of fuselage 20 by continuing these chords (e.g., chord 40) into and around the upper and lower segments of the fuselage section so that tension and compression forces developed in the chords are retained within and carried through section 20 in a more evenly distributed fashion than would be the case if spars 22 were bolted to the fuselage section and thus transferred the wing spar loads to the fuselage over a relatively limited area. The continuation of the chords into the fuselage section requires that each chord, such as shown for chord 40, pass through a region of curvature 44 that marks the transition of the surfaces of the wings 26 with the body of the fuselage 24. Regions 44 are sometimes referred to as the small radius curves at the juncture of the wing spars at the fuselage section, and the radius at regions 44 is usually substantially smaller than the radius at any other region of curvature associated with the chords. In these regions 44 of relatively small radii curvature, tension and compression forces in the upper and lower chords tend to develop secondary forces oriented radially of the curvature of the chords which are attributed to the tendency of a curved member to be straightened by a tension load and to be bent further by a compression load. To efficiently react these radially oriented forces, the wing spar to fuselage junctures are provided with transition web structures 46, one for each joint. As described more fully herein, web structures 46 are in the form of a sandwich structure incorporating a lightweight core material, such as a honeycomb, foam or balsawood core, and having facing panels made of fiber reinforced resin composites. Web structures 46 are arranged adjacent the wing spar roots 42, in registry with the small radius curvature regions 44, and in edgewise relation between the upper and lower chords associated with each wing spar.

Figure 3:
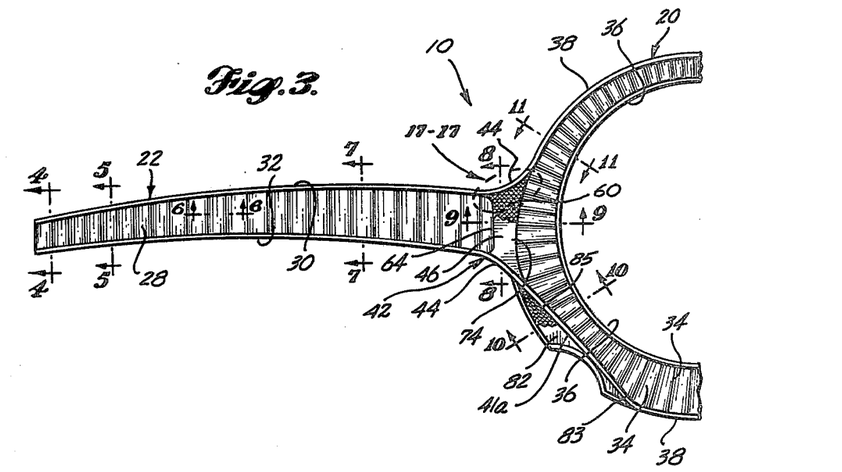
FIG. 3 is a front elevational view of one-half of the frame of FIG. 2.
Figure 4:
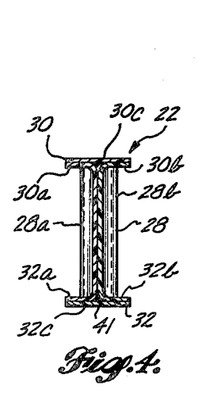
FIG. 4 is a vertical, sectional view of the wing spar taken along line 4—4 of FIG. 3.
Figure 14:
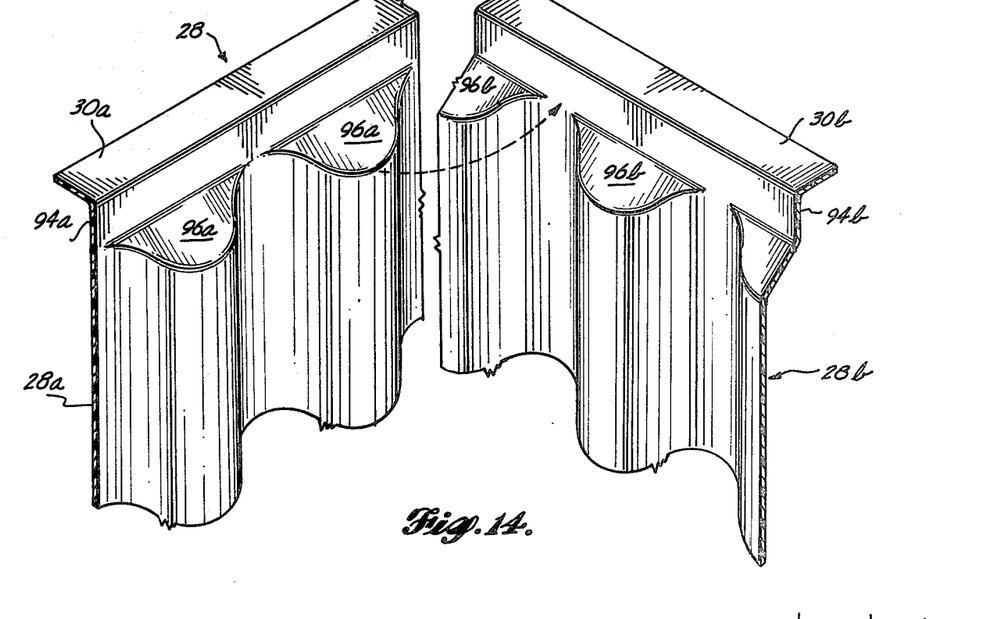
FIG. 14 is an exploded view of the sine wave web that is incorporated in the wing spar of FIG. 3.

The above briefly characterized configuration and fabrication of frame 10 are more fully disclosed by referring to FIGS. 3-11, and commencing the description thereof with the cross sectional shape of wing spar 22 as shown in FIG. 4, taken as a vertical section adjacent the outermost end of the spar. As shown in FIG. 4, web 28 is constituted from two internested web halves 28a and 28b, which as more fully described hereinafter in connection with FIG. 14, are shaped so as to form mating corrugations (see FIG. 6). When wing spar 22 is horizontally disposed, the corrugations of web 28 are vertically oriented to provide the maximum shear resistance to vertical loads on the wing. Web halves 28a and 28b are formed with outwardly opposing flange segments 30a, 32a and 30b, 32b, such that each half 28a and 28b is generally in the shape of a channel with the web of the channel being corrugated, and the channels being arranged together in back to back relation with the corrugations internested. In this manner, flange segments 30a, 32a and 30b, 32b form a base for flanges 30 and 32 which are completed by the addition of cap strips 30c and 32c. The width of cap strips 30c and 32c is selected to span the juxtaposed flange segments 30a, 30b and 32a, 32b. Thus, as viewed in FIG. 4, spar 22 has the basic configuration of an I-beam.

Additionally, spar 22, commencing at its outer end and thus approximately at the cross section shown in FIG. 4, incorporates upper and lower tension/compression chords, including upper chord 40, as introduced above in connection with FIG. 2, and a similar tension/compression chord 41 extending along the lower edge of web 28. The fibers that make up chords 40 and 41 are unidirectional and are sometimes referred to as 0° fibers because most of the fibers extend parallel to the longitudinal dimension of the structure in which they are incorporated. The number of fibers in the bundles forming chords 40 and 41 is selectively varied along the length of spar 22 so as to vary the cross section of the chords in a manner commensurate with the maximum tension and compression loads anticipated at any given cross sectional location along the wing spar.

Figure 5:
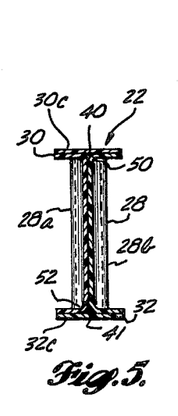
FIG. 5 is another vertical, sectional view of the wing spar taken along line 5—5 of FIG. 3.

Moving inboard from the cross section shown in FIG. 4, the next cross section as depicted in FIG. 5 shows the same I-beam configuration, only now the height of the wing spar has increased for greater shear strength, which it does continuously in the inboard direction in order to support the greater wing loads that occur adjacent root 42 of spar 22. Also as shown in FIG. 5, the cross sections of chords 40 and 41 are relatively small, but larger than in FIG. 4, reflecting the lesser magnitudes of tension and compression loads that occur adjacent the tip of the wing. In comparison the cross section depicted in FIG. 7 and taken at a location closer to root 42 of spar 22 shows substantially larger cross sectional areas for chords 40 and 41. The buildup of the thickness of chords 40 and 41 is achieved by a gradual lay-up of additional fibers commencing at staggered lengthwise intervals to form a uniformly tapered increase in chord cross section.

Figure 7:
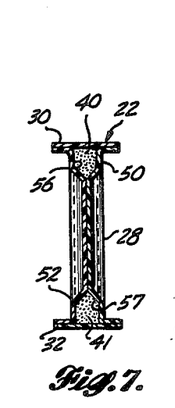
FIG. 7 is another vertical, sectional view of the wing spar taken along line 7—7 of FIG. 3.

In order for wing spar 22 to act efficiently as a structural unit, it is important to provide proper positioning and adequate bonding between chords 40, 41 and the opposed edges of web 28 and flanges 30 and 32. For this purpose and as more fully described in the above referenced U.S. patent application Ser. No. 818,910, web 28 and flanges 30 and 32 are joined by connective structures 50 and 52 which form hollow, lengthwise extending chordways (best shown as chordways 54 and 56 in FIG. 7) shaped and dimensioned with respect to the length of spar 22 for receiving chords 40 and 41. Where the cross sectional areas of chords 40 and 41 are slight, such as at the sections of spar 22 depicted in FIGS. 4 and 5, the size of these chordways is relatively small and is formed simply by a slight divergence of the web halves 28a and 28b as they bend and become flange segments 30a, 30b and 32a, 32b. To accommodate thicker chord dimensions as depicted in FIG. 7, connective structures 50 and 52 are each formed as a "house" shaped cavity, which as described more fully hereinafter, has been found to provide greater strength in reaction to loads that are applied perpendicularly to the lengthwise dimension of spar 22 and to enhance the transmission of forces between the chords and the web 28. While chords 40 and 41 are themselves capable of tolerating substantial tension and compression loads oriented along their length, the positioning of the relatively thickened sections of chords 40 and 41 in the web-to-flange connective structures 50 and 52 of spar 22 should not be such as to significantly diminish the capability of spar 22 to bear loads directed perpendicularly to chords 40 and 41, namely, vertical compression and tension loads applied at the top and bottom of spar 22. The "house" shaped connective structures 50 and 52 have been found to accommodate the needed thickness of chords 40 and 41 adjacent root 42 of spar 22 without intolerably reducing the other strength characteristics of the spar.

Figure 8:
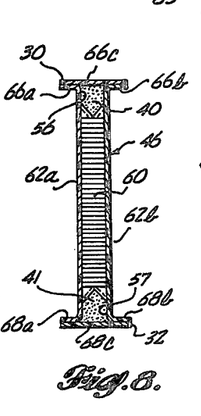
FIG. 8 is a further vertical, sectional view taken along line 8—8 of FIG. 3 where the root of the wing spar joins the fuselage section of the frame.

Now, with reference to FIGS. 3, 8 and 9, transition web structure 46 is shown to include a honeycomb core 60 and a pair of facing panels 62a and 62b made of multiple layers of fiber reinforced resin matrix composites in a manner similar to the corrugated web halves 28a and 28b forming web 28. The direction of greatest strength of core 60 is oriented in the usual manner, orthogonally to the facing panels. As fabricated in the disclosed embodiment, panel 62a and 62b are continuations of the same sheet composites that are laid-up to form web halves 28a and 28b as best illustrated in FIG. 9. An outboard edge 64 of structure 46 is formed with a taper in which panels 62a and 62b converge in the direction toward root 42 of wing spar 22, joining one another and merging into web halves 28a and 28b at the inboard, terminal edge of shear web 28. The associated edge of honeycomb core 60 is formed with a taper conforming to the interior surfaces of the convergent edges of panel 62a and 62b as illustrated.

Along the edges of structure 46 adjacent to the regions 44 of small radius curvature, panel 62a and 62b project, in their defined planes, above and below the upper and lower extents of core 60, respectively, and thereafter turn outwardly to form outwardly opposed flange segments 66a, 66b adjacent the upper edge of structure 46, and outwardly opposed segments 68a and 68b adjacent the lower edge of the structure. These flange segments 66a, 66b and 68a, 68b are capped off by cap strip segments 66c and 68c to form a continuation of flanges 30 and 32 of spar 22 which in turn blend into flange 38 of fuselage section 20.

The resulting configuration of transition web structure 46 forms continuations of the hollow chordways 56 and 57 which in turn receive continuations of chords 40 and 41 into fuselage section 20. To effectively transmit radially oriented forces exerted by chords 40 and 41 in the vicinity of transition structure 46, both bundles of fibers that form these chords are securely bonded to the inwardly opposed surfaces of panels 62a and 62b, in the same manner that the bundles of chord fibers are bonded to the interior wall surfaces of chordways 56 and 57 formed between web 28 and flanges 30 and 32.

Depending upon the anticipated loads associated with chords 40 and 41 in regions 44, transition structure 46 extends inboard a preselected distance, from the root 42 of spar 22. In this embodiment, structure 46 extends inwardly to a curved line of termination which generally coincides with the circumferentially extending outer edge of the web 34 of fuselage structure 20. More particularly, structure 46 terminates along an edge 74 (FIGS. 3 and 9) in a structure that is somewhat more complex than the terminal edge 64 of structure 46 because of the radial orientation of the corrugations of sine wave web 34. To effectively connect the radially oriented corrugations with the sandwich configuration of structure 46, edge 74 is shaped in a fashion similar to the "house" shaped connective structures 50 and 52 that join the lengthwise edges of web 28 with flanges 30 and 32. At these locations along edge 74 of structure 46 that are joined to the midamplitude portions of web 34, the margins of panels 62a and 62b are inwardly convergent and thus appear similar to the panels along edge 64 as shown in FIG. 9. On the other hand, at the maximum amplitude portions of web 34, panels 62a and 62b continue in their established planes inwardly from edge 74, and form the ridges of the corrugations of web 34.

Figure 6:
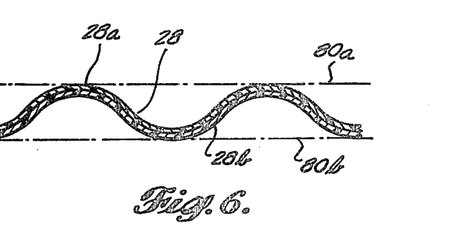
FIG. 6 is a fragmentary horizontal, sectional view of the sine wave web of the wing spar of FIG. 3 taken along line 6—6 therein, in which the associated flange structure of the wing spar has been omitted for clarity.

Comparing FIGS. 4 through 9, it will be observed that the sine wave shear webs 28 and 34 in the wing spar and fuselage section are of the same amplitude, which as illustrated in FIG. 6 for web 28, lies in an envelope bounded by a pair of spaced parallel reference planes 80a and 80b. Moreover, in the presently preferred embodiment as disclosed, the thickness of sandwich transition structure 46 is equal to the amplitude of the sine wave webs as best illustrated in FIG. 9, thereby forming an integrated sine wave and sandwich web structure of uniform thickness throughout the interior of frame 10, a design feature which increases the ease with which the individual frames may be fabricated, and simplifies the assembly of the multiple frames in building the framework of the aircraft body.

With reference to FIG. 10, the tension/compression chord 41 extending along the lower edge of wing spar 22 is continued, in this embodiment, inside the radius of the outer flange 38 of the fuselage section 20 as indicated by the segment 41a of chord 41. After rounding the sharp curvature region 44, segment 41a continues in a generally straight path to a point 83 well inwardly and below transition structure 46 where it rejoins flange 38. From point 83, chord 41 continues on around the lower half of fuselage section 20 and thence outwardly along the lower edge of the opposite wing spar. As best illustrated in FIG. 10, the inboard edge of chord segment 41a is contiguous with a truncated, outer edge of sine wave shear web 34 to which chord segment 41a is bonded. The region lying between the outboard edge of chord segment 41a and the interior surface of outer flange 38 of structure 20 is filled in by a sandwich web structure 82 having a honeycomb core 85, which is similar in construction and cell size to honeycomb core 60. Inboard of point 83, chord 41 continues into a hollow chordway by a "house" shaped connective structure formed between flange 38 and web 34, in the same manner that chord 41 is encapsulated between web 28 and flange 32 as depicted in FIG. 7.

Figure 11:
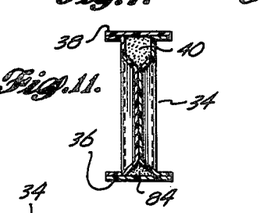
FIG. 11 is another sectional view taken along a radially oriented plane as indicated by line 11—11 in FIG. 3 and passing through the fuselage section at a location above and adjacent the joint between the wing spar and fuselage section.

With reference to FIG. 11, the upper chord 40 continues along the upper edge spar web 28 and traverses transition structure 46 and from there continues into and around the upper half of fuselage section 20. In section 20, chord 40 is encapsulated in a chordway formed by a "house" shaped connective structure that joins the circumferentially outer edge of web 34 to flange 38 in the same manner that chord 40 is housed by connective structure 50 between web 28 and flange 30 as shown in FIG. 7. The inner edge of the fuselage web 34 may also be formed with a reinforcing chord 84, as shown in FIGS. 9, 10 and 11, encapsulated by the connective structure that joins the inner edge of web 34 to the circumferentially extending inner flange 36.

Figure 12:
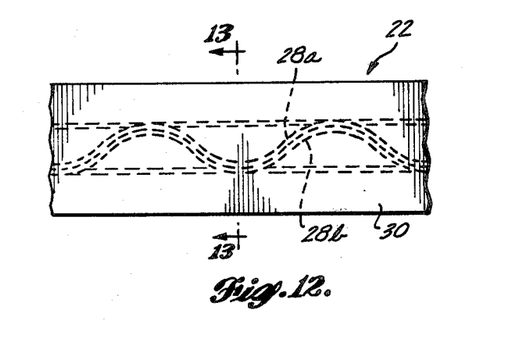
FIG. 12 is a plan view of a fragment of the wing spar shown in FIG. 3.
Figure 13:
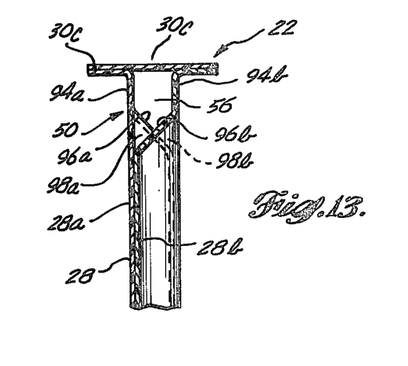
FIG. 13 is a vertical, sectional view taken along line 13—13 of FIG. 12.

Certain details of the construction, and fabrication of wing spars 22 are best illustrated in FIGS. 12-14. FIG. 12 illustrates a top view of a longitudinal segment of spar 22 in which the hidden lines illustrate the internested and bonded together corrugations of the web halves 28a and 28b. In FIG. 13, an enlarged transverse section of spar 22 is illustrated with the chord being removed to show more clearly the configuration of the chordway 56 formed by the "house" shaped connective structure 50. The walls of structure 50 adjacent flange 30 are planar wall segments 94a and 94b that respectively lie within the reference planes which form the envelope bounding the corrugations of web 28 (see reference planes 80a and 80b of FIG. 6). Wall segments 94a and 94b are connected to the corrugations of web halves 28a and 28b by obliquely oriented, oppositely inclined end wall segments 96a and 96b. When viewed along the length of chordway 56, the criss-crossing end wall segments 96a and 96b form, as viewed in FIG. 13, an inverted roof section which together with wall segments 94a and 94b and cap strip 30c complete the "house" shaped chordway 56 for receiving the chord 40 as illustrated in FIG. 7. It is observed that a chord, such as chord 40, having a cross section that conforms to the "house" shape of chordway 56, when received within chordway 56, will leave pockets of free space indicated in FIG. 13 by reference numerals 98a and 98b. These free space pockets are initially filled in with a resin material, during the final assembly phases of frame 10, but before installing the bundles of fibers forming the chord.

FIG. 14 illustrates how the web halves 28a and 28b are initially formed and then assembled and bonded together to complete the web. A more complete disclosure of these fabrication steps is set forth in the previously mentioned U.S. patent application, Ser. No. 818,910. As shown in FIG. 14, the corrugations of web halves 28a and 28b project inwardly from base planes that are co-planar with wall segments 94a and 94b such that the maximum amplitude portions of the web corrugations alternately lie within the planes of wall segment 94a and wall segment 94b. This feature is also illustrated in FIG. 13. Flange segments 30a and 30b are, as mentioned above, formed integrally with the respective web halves so that a complete web half, if separately fabricated, would appear as a generally channel-shaped member with the web portion of the channel having the corrugations that project outwardly from the base plane that includes wall segment 94a or 94b, and in the opposite direction from the projection of the respective flange segments 30a or 30b. Similarly, sine wave shear web 34 of fuselage section 20 (FIGS. 3 and 9-11) can be formed in symmetrical web halves with integral flange segments and combined and bonded together in the same fashion as described immediately above for web 28 of spar 22. Moreover, the respective web halves of spar 22 and fuselage segment 20, including transition web structure 46, may be laid-up on separate parts of a multipart mold, and then combined and cured together in one operation. More particularly, the composites of the frame may be laid-up in two symmetrical halves and then combined and bonded together by inserting the honeycomb cores 60 and 82, on both sides of the fuselage section 20 prior to the joining of the two frame halves, and while holding the two frame halves together, the various chords and cap strips that complete the frame structure can be added and then the entire assembly pressed together, in the environment of an elevated temperature, to bond and co-cure the various resinous components into a unitary structure. An appropriately shaped bonding jig, incorporating elastomeric pads, such as disclosed in application Ser. No. 818,910, can be used to hold the parts together during the curing process.

The most dramatic advantage realized from the fabrication of frame 10 as described above is the integration of wing spars 22 with fuselage section 20 to absorb bending loads. The wing spars are subjected to bending mode loads that result from force couples which develop adjacent the roots 42 of spars 22 in reaction to vertically oriented forces on the wings. As an example and referring to FIG. 3, assume that a vertically oriented downwardly directed force is applied to the upper surface of spar 22 adjacent the outboard end of the spar. This downwardly directed force will be resisted in shear, by shear web 28. Moreover, a force couple will develop adjacent root 42 of the spar, placing chord 40 in tension and placing chord 41 in compression. In the small radius region 44 of chord 40, which may be as small as a 6 inch radius, this tension force tends to deform the nominal configuration of chord 40 by urging it into a straighter configuration. The resulting strain placed on chord 40, tends to pull the bundle of chord fibers away from the frame. The strain is especially pronounced in region 44, and develops radially oriented force components 104 which are resisted by the reaction of transition structure 46 which is loaded locally in tension. The tension loading of structure 46 is borne substantially entirely by the flat panels 62a and 62b which are highly effective in this respect because the honeycomb core 60 stabilizes panels 62a and 62b and prevents them from buckling or otherwise deforming under the load. The panels 62a and 62b thereupon redistribute the load into the frame 20 in tension, compression and shear.

Figure 18:
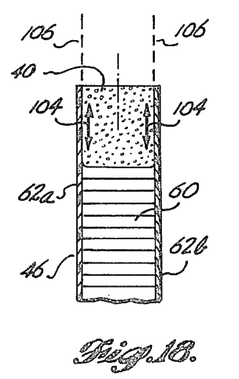
FIG. 18 is a sectional view taken along a radially oriented plane as indicated by line 18—18 in FIG. 17.

Furthermore, as shown by FIG. 18, the radially oriented force components 104 are aligned with the bond shear lines 106 where the strength of the bond between the sides of chord 40 and the inwardly opposing surfaces of panels 62 and 62b is the strongest under tension and compression loading.

A similar reaction by transition structure 46 supports the radially oriented compression loads that occur along chord 41 in the lower small radius region 44 of FIG. 3, which tend to push chord 41 into structure 46. Again the radial loads are resisted by the reaction of panels 62a and 62b along the bond shear lines between chord 41 and the inwardly opposed surfaces of panels 62a and 62b where the bond has the greatest strength.

A similar, but oppositely oriented set of radial forces and counter forces develop when spar 22 is loaded by a vertically oriented, upwardly directed force applied to the underside of the spar.

Figure 15:
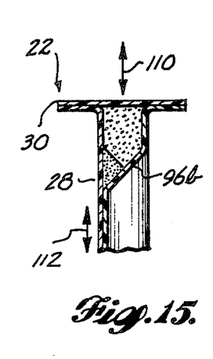
FIG. 15 and 16 are cross sectional views of fragments of the flanged, sine wave web that forms part of the fuslage section in the frame shown in FIG. 3.
Figure 16:
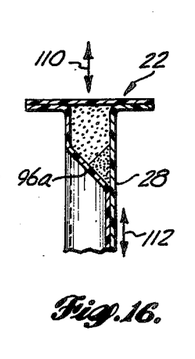

It will be appreciated that the planar configuration of panels 62a and 62b of structure 46 are more efficient in reacting the radially oriented force components associated with the chords 40 and 41, than would be a sine wave web. This can be visualized by referring to FIG. 15 and 16 which show different sections of the sine wave shear web of wing spar 22. In FIG. 15, a compression or tension force 110 oriented perpendicularly to the length of web 28 is reacted by an opposing tension or compression force 112 almost totally along those segments of web 28 where the amplitudes of the corrugations extend directly to flange 30 in line with the applied force. In FIG. 16, force 110 is reacted by force 112 along alternate, ridge portions of web 28. In the regions between the maximum amplitude or ridge portions of web 28, the inclined orientation of end wall segments 96a and 96b prevent the web from effectively transmitting the tension and compression forces 110 and 112. In contrast, panels 62a and 62b of transition structure 46 form planar members, that are at all locations, parallel to and in alignment with the applied tension and compression forces transmitted through the bond shear lines 106 (FIG. 18).

Figure 19:
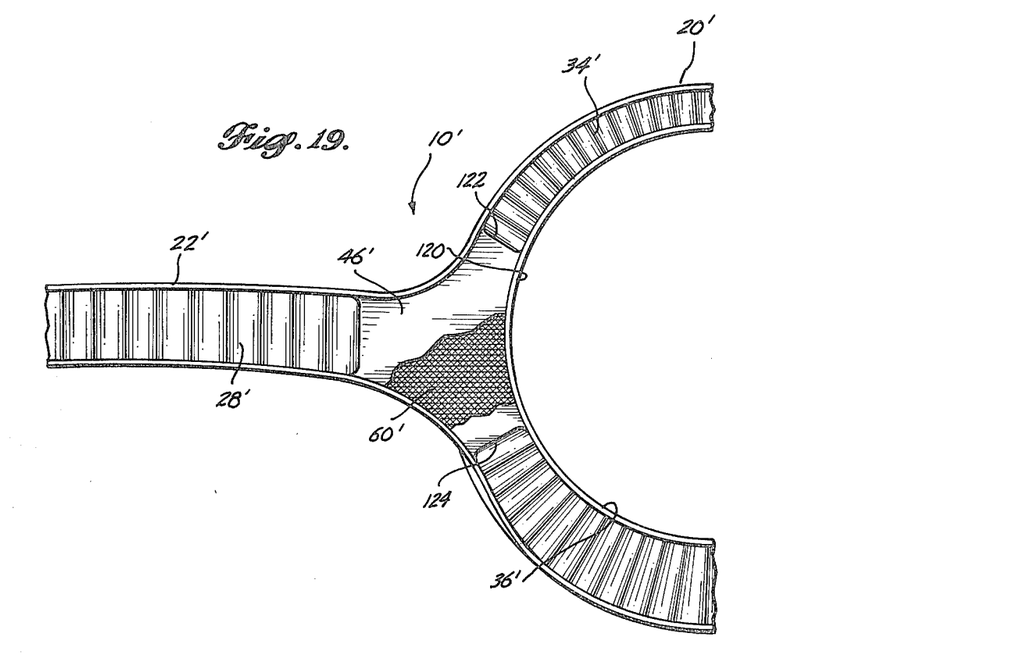
FIG. 19 is a fragmentary view of an alternative embodiment of the transition structure that joins the root of the wing spar to the fuselage section of the frame.

With reference to FIG. 19, an alternative configuration of the transition structure of the frame is illustrated in which primed reference numerals are used to refer to corresponding parts of the previously described frame 10 shown in FIGS. 2 through 18. Thus, in FIG. 19 frame 10' includes a fuselage section 20' and a pair of wing spars, one of which is shown as spar 22'. The manner of joining spar 22' to fuselage section 20' is similar to the above described embodiment except that transition structure 46' extends substantially further inboard of the fuselage section 20' and terminates along an edge 120 congruently mated to the inner circumferential flange 36' of fuselage section 20', and along edges 122 and 124 oriented in radial alignment with the corrugations of fuselage web 34'. The configuration of structure 46' has similar load bearing capabilities to the previously described structure 46 of frame 10, except that by extending structure 46' inwardly and abutting it against the interior flange 36' of the fuselage section 20', the reactive load bearing capability of the transition structure 46' is increased somewhat due to the larger area of structure 46' over which the reactive tension, compression and shear loads are distributed. The trade off in using the extended transition structure 46' as shown in FIG. 19 is the decrease in possible fuel storage capacity because of the greater volume displacement of structure 46' over the segment of the sine wave shear web 34' that is replaced by the extended structure 46'.

Figure 20:
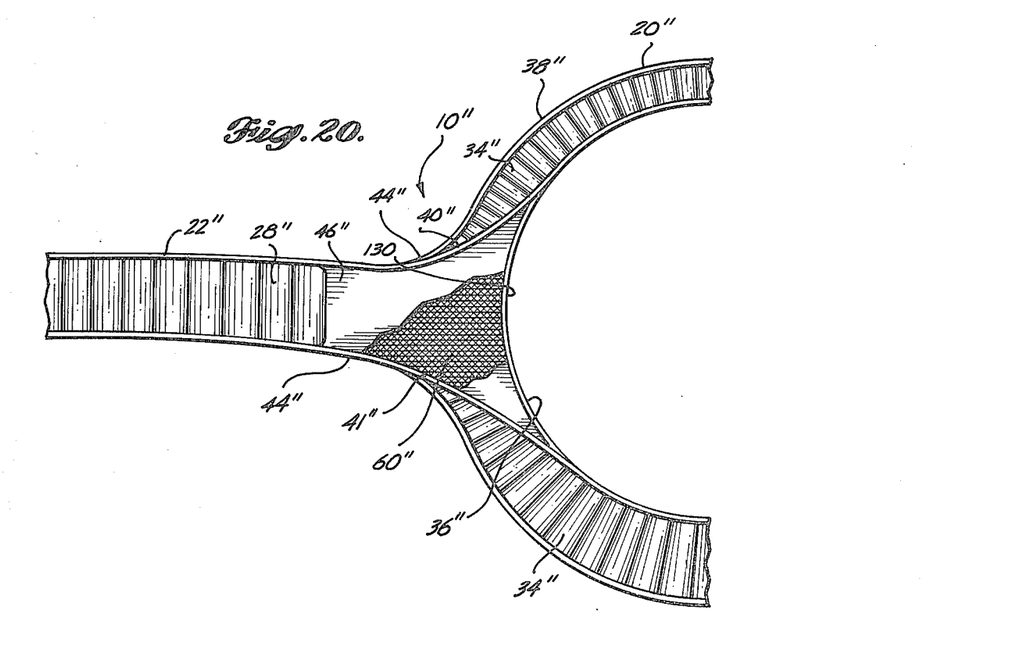
FIG. 20 is a further alternative embodiment of the transition structure that joins the wing spar root to the fuselage section.

With reference to FIG. 20, a further alternative embodiment of the frame is shown in which double primed reference numerals are used to refer to corresponding parts of the previously described frame 10. In particular, frame 10" in FIG. 20 provides a transition structure 46" which is similar to the extended structure 46' in the embodiment in FIG. 19 in that structure 46" extends inboard to a terminating edge 130 congruently mated to the inner flange 36" of the fuselage section 20". The most significant difference, however, in the frame 10" is the provision for extending the tension/compression chords 40" and 41" into and across the radial dimension of fuselage section 20" such that the chords tangentially meet with the connective structure between the inner circumferential edge of fuselage shear web 34" and the inner circumferential flange 36", and continue around the inner circumference of the fuselage section 20" rather than around the outer circumference of the fuselage section. In fabricating the frame 10", chords 40" and 41" are each interposed between a segment of the sine wave shear web 34" of section 20" and the opposed (upper and lower) edges of transition structure 46" in essentially the same manner that chord segment 41a of the frame 10, as shown in FIG. 3, is bonded between an edge of shear web 34 and the honeycomb core transition structure 82 (also see FIG. 10).

Figure 17:
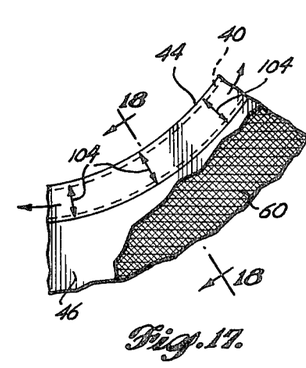
FIG. 17 is a fragmentary view, partly broken away for clarity, showing a segment of a transition structure that joins the root of the wing spar with the fuselage section as shown by the dotted line region 17 in FIG. 3.

The structural advantage obtained by the configuration of frame 10" in FIG. 20 is a minimization of the amount of curvature required for chords 40" and 41" as they pass from wing spar 22" into the fuselage section 20". By reducing the radius of curvature in regions 44", the magnitude of the radially oriented compression and tension forces (discussed above in connection with FIGS. 17 and 18) that are applied to the transition structure 46" by the chords 40" and 41" is reduced.

While several preferred embodiments of the invention have been described above in detail, it will be apparent that numerous modifications can be made to these embodiments without departing from the principles of the invention as more particularly set forth in the appended claims.

The embodiments of the invention in which an exclusive property or privilege is claimed are defined as follows:

1. A unitary blended wing-fuselage frame for an aircraft body, comprising:
   a generally annular fuselage section having a circumferentially disposed sine wave web made of fiber reinforced resin matrix composites and characterized by generally radially oriented corrugations, and further having inner and outer circumferentially extending flanges that are made of fiber reinforced resin matrix composites affixed and bonded to the radially inner and outer edges of ssaid web by flange-to-web connective structures which are shaped and sized for receiving circumferentially extending tension/compression bearing chords;
   a pair of wing spars joined to said fuselage section and projecting outwardly therefrom in generally radially opposed directions, each of said wing spars having a lengthwise extending sine wave shear web made of fiber reinforced resin matrix composites and characterized by generally vertically oriented corrugations, and further having upper and lower lengthwise extending flanges that are made of fiber reinforced resin matrix composites affixed and bonded to the upper and lower edges of said sine wave shear web of said wing spar by flange-to-web connective structures which are shaped and sized for receiving lengthwise extending tension/compression bearing chords;

a plurality of tension/compression bearing chords each made of a bundle of unidirectionally oriented fibers embedded in a resin matrix, a first of said chords being arranged to extend continuously from a point adjacent an outboard tip of a first of said wing spars, inwardly along the upper edge thereof and within said flange-to-web connective structure thereat, into and around an upper portion of said fuselage section, and thence into said flange-to-web connective structure on the upper edge of the second and opposite said wing spar and outwardly therealong to a point of termination adjacent an outboard tip of the second wing spar, and a second one of said chords being arranged to extend continuously from a point adjacent an outboard tip of the first said wing spar, inwardly along the lower edge thereof and within said flange-to-web connective structure thereat, into and around a lower portion of said fuselage section and thence into the flange-to-web connective structure on the lower edge of the second said wing spar and outwardly therealong to a point of termination adjacent the outboard tip of the second said wing spar, said first and second chords each having lengthwise segments of substantial curvature adjacent the locations where said wing spars join the fuselage section; and transition web structures, one for each of the locations where said wing spars join said fuselage section, each of said transition web structures having a pair of spaced parallel facing panels made of fiber reinforced resin matrix composites and a core sandwiched between said panels and bonded to the inwardly opposed surfaces of said panels and being disposed in edgewise relation between said first and second chords in the region where the associated wing spar joins the fuselage section to react radially oriented forces developed by said first and second chords along said segments of substantial curvature when the associated one of said wing spars is subjected to a bending load in the vertical plane.

2. In a blended wing-fuselage frame for an aircraft body in which a pair of opposed wing spars incorporating sine wave shear webs of fiber reinforced resin matrix composites are joined to a fuselage section incorporating a circumferentially oriented sine wave shear web, and in which chords of bundled, unidirectional fibers are provided along the opposed edges of the shear webs of each of said wing spars and along the circumferentially inner and outer edges of the shear web in said fuselage section for bearing tension and compression loads oriented along the edges of the respective webs, wherein the improvement in the manner of joining each of said wing spars to the fuselage section comprises:

means for extending in a continuous fashion said chords that are provided along the opposed edges of said shear webs of each of said wing spars around regions of curvature occurring where said wing spars join said fuselage section and thence into said fuselage section where said chords extend circumferentially around the edges of said fuselage shear web; and transition structure means disposed in the areas at which said wing spars join said fuselage section for acting in compression, tension and shear to react forces that radiate radially from said chords in said regions of substantial curvature when said wing spars are subjected to bending loads; and wherein said transition structure means comprises first and second transition webs, one for each of said areas, each of said first and second transition webs having a pair of spaced parallel panels made of fiber reinforced resin matrix composites and a core sandwiched between said panels and bonded to the inwardly opposed surfaces of said panels, said first and second transition webs being disposed in said areas, on opposite sides of said fuselage section and, in edgewise relationship between said chords at said regions of substantial curvature so that a tension load on one of said chords creates radially oriented tension forces that are reacted by tension in an adjacent one of said transition webs, and so that a compression load on one of said chords causes radially oriented compression forces that are reacted by compression in an adjacent one of said transition webs.

3. The improvement set forth in claim 2, wherein each of said first and second transition webs has a thickness that is substantially equal to and in edgewise alignment with the maximum amplitude thickness of said sine wave webs.

4. The improvement set forth in claim 2 wherein each of said first and second transition webs has one edge bonded to one of said chords and an opposite edge bonded to the other of said chords, and wherein each of said first and second transition webs has an outboard edge bonded to said sine wave shear web of the associated wing spar and has an inboard edge opposite said outboard edge that is bonded to the outer circumferential edge of said circumferentially oriented sine wave shear web of said fuselage section.

* * * * *